3,171,735
TREATMENT OF ARSENICAL DROSSES
Philip Malcolm James Gray, Avonmouth, England, assignor to Metallurgical Processes Limited, Nassau, Bahamas, a company of the Bahamas, and The National Smelting Company Limited, London, England, a British company, doing business as Metallurgical Development Company, Nassau, Bahamas
No Drawing. Filed June 27, 1961, Ser. No. 119,823
Claims priority, application Great Britain, July 6, 1960, 23,589
5 Claims. (Cl. 75—24)

The invention relates to a method of treating arsenical drosses arising in the blast furnace smelting of zinc and lead. More especially the invention relates to a method of treating arsenical drosses containing chloride flux so that they may be handled safely without evolution of arsine.

Drosses containing chloride flux, such as those drosses from the flux bath, contain a high proportion of arsenic and give off arsine on contact with water in the cold. As the dross is deliquescent, it is accordingly too dangerous to handle and return to the sinter plant, although this is desirable from an economic point of view. Thus it is necessary to reduce the arsenical dross to a non-toxic form.

The inventions consists in a method of treating arsenical dross consisting in leaching the dross in a bath of molten lead conveniently at 600°–650° C. and preferably for 10 to 15 minutes.

The invention may also be carried out, although in some respects less efficiently, with the lead temperature of 500°–650° C. for a leaching time of 5–30 minutes.

Up to 50% of the arsenic is lost during the treatment mostly by volatilization but partly by solution in the lead.

Although the dross treated as described above produces very little arsine on static contact with water it still does evolve some arsine on prolonged standing when disturbed. Preferably therefore the dross resulting from the lead leaching is conditioned by mixing it with 6–10% water, this being carried out over a period of 45 to 50 minutes.

The invention may also be carried out, although in some respects less efficiently, if the lead is conditioned by 2–10% of water for 20–60 minutes.

It is not clear why this leaching does render the dross immune to arsine evolution with water but it may be that the untreated flux bath dross, containing zinc arsenide, chloride and metallic zinc, produces an acid solution with water which reacts with the arsenide to give arsine. Zinc arsenide does not react with a neutral solution, and after treatment in the absence of metallic zinc which has been taken up by the molten lead an acid solution is not produced.

The metal dissolved from the dross may be subsequently recovered from the lead.

The evolution of arsine on mixing with water may be further reduced, by mixing the arsenical flux dross with roughly an equal amount of non-arsenical dross, which may be zincy external drosses. The mixing may be done before the lead leaching step or by adding arsenical and non-arsenical drosses alternately to the lead leaching bath.

The invention will be further described with reference to the following example.

*Example*

Approximately equal weights of flux bath dross and zincy external drosses were mixed in a dross box (the exact proportions are not critical).

Between 100 and 150 pounds of this dross were emptied on to the surface of the lead held at a temperature of 600–650° C. in a tank 2′ 6″ in diameter, holding 2 tons of lead and fitted with an 8″ impeller. The bath was then stirred for 10–15 minutes.

Half of the treated dross was then removed by raking up a ramp into an empty dross box, and another 100–150 lbs. of dross were added and stirred for 10–15 minutes. This was then repeated until all the dross had been dealt with.

One-third of the lead was then pumped into a cooling ladle and replaced with a similar amount of cooled lead. As the lead in the ladle cooled, zinc was skimmed off and returned to the condenser pump sump.

The box with the dry treated dross was allowed to cool under ventilation until fuming ceased and discharged through a tippler. The dross was then conditioned.

In the undersize bin of the tippler the treated dross was associated with about 500 lb./hr. of other drosses (from e.g. oxide external drosses). These were only roughly mixed.

The drosses were fed in 450 lb. batches to two paddle mixers in parallel and conditioned for 45–50 minutes with about 6% of water, enough to prevent dusting. The mixer was exhausted with 100 c.f.m. of air. The dross was then stored.

It is necessary positively to vent the mixers, tippler, trommel and the storage bins for conditioned dross.

The following figures were obtained.

|  | Dry wt. (lb.) | Zinc (lb.) | Lead (lb.) | Chlorine (lb.) | Arsenic (lb.) |
|---|---|---|---|---|---|
| Input: |  |  |  |  |  |
| Flux bath dross | 250 | 102.4 | 67.6 | 29.8 | 4.0 |
| Holding bath dross | 250 | 191.2 | 15.8 |  | 1.2 |
|  | 500 | 293.6 | 83.4 | 29.8 | 5.2 |
| Output: |  |  |  |  |  |
| Dross | 368 | 199.0 | 75.8 | 18.8 | 2.2 |
| Metal | 136 | 134.6 | 1.4 |  |  |
|  | 504 | 333.6 | 77.2 | 18.8 | 2.2 |

The concentration of arsine ($AsH_3$) in the exhaust air at the end of the mixing stage was 6 parts per million and the total evolution of arsine during the mixing was 92 parts per million parts of dross.

Various modifications may be made within the scope of the invention.

I claim:

1. A method of treating zinciferous arsenical drosses arising in connection with the operation of a zinc blast-furnace, said dross containing chloride flux, which comprises leaching the arsenical dross containing the chloride flux in a bath of molten lead at between 500°–650° C. to remove a substantial amount of asenic by volatilization and by solution in the lead and subsequently conditioning the leached dross for about 20–60 minutes with about 2 to 10% of its weight of water to render the dross substantially immune to the evolution of arsine upon contact with further quantities of water.

2. A method as claimed in claim 1 in which the leached dross is mixed with non-arsenical zinciferous dross before water is added.

3. A method as claimed in claim 2, in which the non-arsenical dross is mixed with the arsenical dross before the lead leaching.

4. A method as claimed in claim 2, in which the non-arsenical dross is added into the lead leaching bath containing arsenical dross.

5. A method as claimed in claim 1 in which zinc leached from the dross is subsequently recovered from the lead.

References Cited by the Examiner

UNITED STATES PATENTS

| | | | |
|---|---|---|---|
| 1,931,285 | 10/33 | Colcord et al. | 75—24 |
| 2,464,262 | 3/49 | Robson et al. | 75—86 |

OTHER REFERENCES

Mathewson: Zinc, The Metal, Its Alloys and Compounds, Reinhold Publishing Corp., New York, New York, 1959, pp. 198, 292.

Hansen: Constitution of Binary Alloys, McGraw-Hill Book Co., New York, New York, 1958, pp. 173, 174, 185, 186, 1118, 1119.

BENJAMIN HENKIN, *Primary Examiner.*

RAY K. WINDHAM, DAVID L. RECK, *Examiners.*